United States Patent
Wang et al.

(10) Patent No.: US 10,860,872 B2
(45) Date of Patent: Dec. 8, 2020

(54) VIRTUAL VEHICLE OCCUPANT RENDERING

(71) Applicant: Ford Global Technologies, LLC, Dearborn, MI (US)

(72) Inventors: Nanxin Wang, Novi, MI (US); Jian Wan, Novi, MI (US); Gary Steven Strumolo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 16/087,121

(22) PCT Filed: Mar. 21, 2016

(86) PCT No.: PCT/US2016/023340
§ 371 (c)(1),
(2) Date: Sep. 21, 2018

(87) PCT Pub. No.: WO2017/164835
PCT Pub. Date: Sep. 28, 2017

(65) Prior Publication Data
US 2019/0095733 A1 Mar. 28, 2019

(51) Int. Cl.
*G06K 9/00* (2006.01)
*H04N 7/18* (2006.01)
(Continued)

(52) U.S. Cl.
CPC ......... *G06K 9/00845* (2013.01); *B60N 2/002* (2013.01); *G06F 3/017* (2013.01); *G06K 9/00355* (2013.01); *G06K 9/00375* (2013.01); *G06K 9/6297* (2013.01); *H04N 5/247* (2013.01); *H04N 7/181* (2013.01); *B60N 2/0224* (2013.01)

(58) Field of Classification Search
CPC .................................................. G06K 9/00845
See application file for complete search history.

(56) References Cited

U.S. PATENT DOCUMENTS 7,036,094 B1 * 4/2006 Cohen ................ G06K 9/00348
715/863
7,110,570 B1 9/2006 Berenz et al.
(Continued)

FOREIGN PATENT DOCUMENTS

| CN | 103707781 A | 4/2014 |
|---|---|---|
| DE | 102009040995 A1 | 4/2010 |
| EP | 1261505 B1 | 12/2002 |

OTHER PUBLICATIONS

Notification dated Oct. 4, 2018 transmitting International Preliminary Report on Patentability and Notification dated Jun. 27, 2016 transmitting International Search Report and Written Opinion (31 pages).
(Continued)

*Primary Examiner* — Oneal R Mistry
(74) *Attorney, Agent, or Firm* — Brandon Hicks; Bejin Bieneman PLC

(57) ABSTRACT

Image data of a vehicle occupant are collected from a plurality of cameras. A dimensional model of substantially an entire body of the vehicle occupant is generated based on the image data. A gesture performed by the vehicle occupant is recognized based on the dimensional model. A vehicle subsystem is adjusted based on the gesture.

16 Claims, 5 Drawing Sheets

(51) Int. Cl.
  *B60N 2/00* (2006.01)
  *G06K 9/62* (2006.01)
  *G06F 3/01* (2006.01)
  *H04N 5/247* (2006.01)
  *B60N 2/02* (2006.01)

(56) References Cited

U.S. PATENT DOCUMENTS

| | | | |
|---|---|---|---|
| 8,645,029 B2 | 2/2014 | Kim et al. | |
| 9,972,184 B2* | 5/2018 | Freeck | G08B 21/06 |
| 2005/0031166 A1 | 2/2005 | Fujimura et al. | |
| 2009/0278915 A1 | 11/2009 | Kramer et al. | |
| 2012/0169526 A1 | 7/2012 | Reilhac | |
| 2013/0154298 A1 | 6/2013 | Ricci | |
| 2013/0329960 A1 | 12/2013 | Sandahl et al. | |
| 2014/0309813 A1* | 10/2014 | Ricci | G06F 16/583 701/2 |
| 2016/0314366 A1* | 10/2016 | Omi | G08B 21/06 |
| 2017/0153714 A1* | 6/2017 | Gao | G06F 3/017 |
| 2017/0242428 A1* | 8/2017 | Pal | B60K 28/06 |
| 2017/0269599 A1* | 9/2017 | Ansari | G05D 1/0212 |
| 2020/0057783 A1* | 2/2020 | Ricci | G06F 3/017 |

OTHER PUBLICATIONS

Ying Wu, et. al., "Vision-Based Gesture Recognition: A Review", Lecture Notes in Computer Science, vol. 1739, pp. 103-115, Dec. 20, 2001, retrieved from Internet URL: http://rd.springer.com/chapter/10.1007/3-540-46616-9_10#page-1 (3 pages).

Cuong Tran, et. al., "Towards a Vision-Based System Exploring 3D Driver Posture Dynamics for Driver Assistance: Issues and Possibilities", IEEE Intelligent Vehicles Symposium, University of California, San Diego, CA, Jun. 21-24, 2010, pp. 179-184 (6 pages).

Glenn Sheasby, et. al., "Simultaneous Human Segmentation, Depth and Pose Estimation Via Dual Decomposition", pp. 1-12 (12 pages).

Vladimir Pavlovic, et. al., "Visual Interpretation of Hand Gestures for Human-Computer Interaction: A Review", IEEE Transactions on Pattern Analysis and Machine Intelligence, vol. 19, No. 7, Jul. 1997, pp. 677-695 (19 pages).

* cited by examiner

VIRTUAL VEHICLE OCCUPANT RENDERING

BACKGROUND

Motion capture devices collect data on occupants in a vehicle to recognize commands from occupants. Typically, a camera collects 2-dimensional image data from a single orientation and captures a part of a body of the occupant. However, such devices may not provide information on the entire body of the occupant, limiting the commands that the vehicle can recognize. Furthermore, a single camera may be obstructed by objects in the vehicle, e.g., a vehicle seat. Further still, the data may not be usable with image data collected from other cameras positioned at different orientations.

DETAILED DESCRIPTION

Data collectors positioned in a plurality of locations in a vehicle may collect data about one or more vehicle occupants to develop three-dimensional (3D) models of each of the occupant(s). The three-dimensional model, i.e. an occupant avatar, can represent specific body parts of the occupants and can be used to track movement of the body parts. The occupants may perform gestures, i.e., specific sets of movements of body parts that signify an action to actuate a vehicle subsystem. Based on one or more gestures identified in a virtual model, a computing device may selectively actuate one or more vehicle subsystems.

Figure 1:
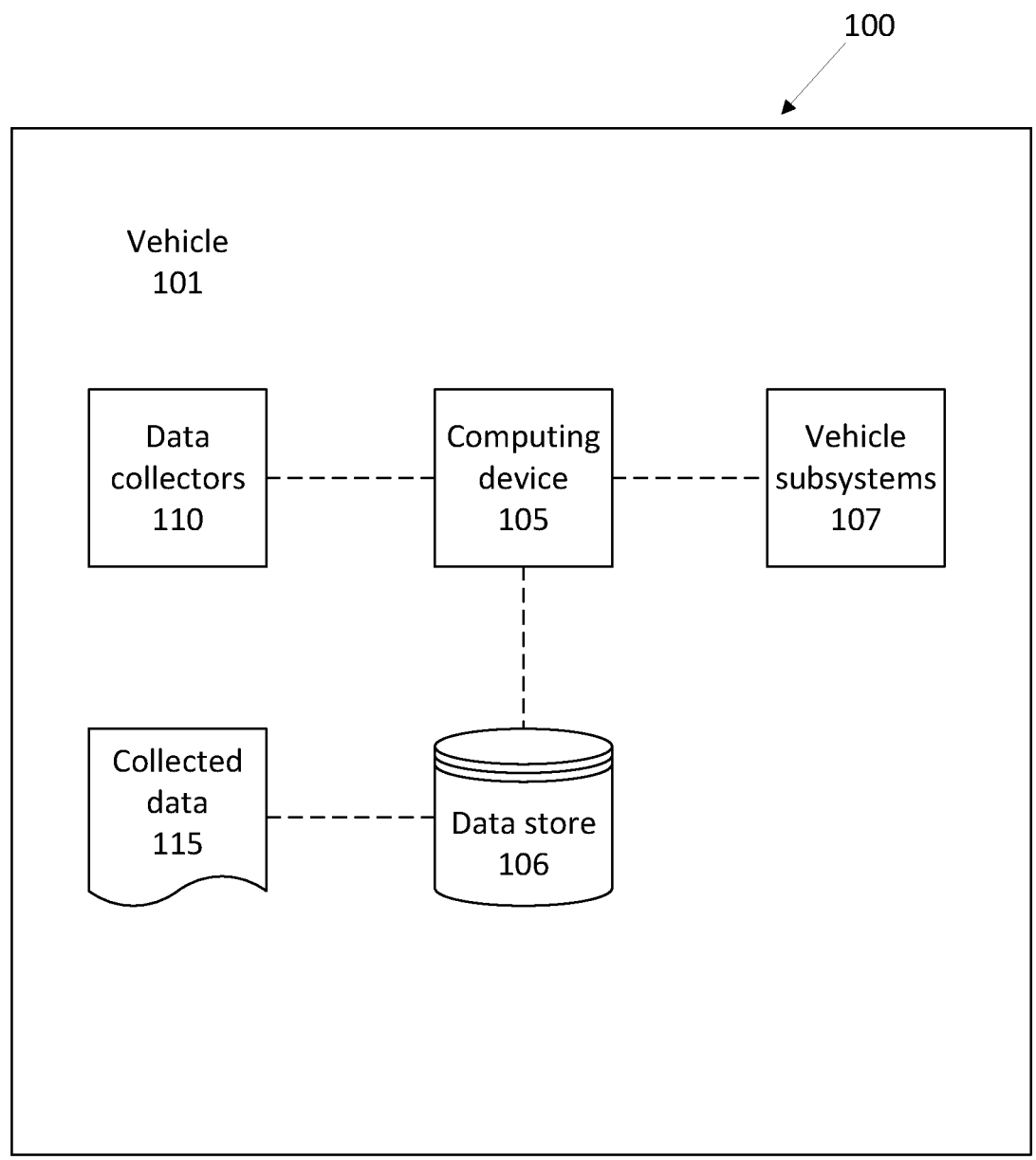
FIG. 1 is a block diagram of an example system in a vehicle.

FIG. 1 illustrates an example system 100 for rendering an occupant avatar in a vehicle 101. A computing device 105 is programmed to receive collected data 115 from one or more data collectors 110, e.g., vehicle 101 sensors, concerning various metrics related to the vehicle 101. For example, the metrics may include measurements of vehicle 101 systems and components (e.g. a steering system, a powertrain system, a brake system, internal sensing, external sensing, etc.).

The computing device 105 is generally programmed for communications on a vehicle network that may include a controller area network (CAN) bus or the like, and or other wireless and/or wired networking technologies, such as Wi-Fi, Ethernet, etc. The computing device 105 may also have a connection to an onboard diagnostics connector (OBD-II). Via the CAN bus, OBD-II, and/or other wired or wireless mechanisms, the computing device 105 may transmit messages to various devices in a vehicle and/or receive messages from the various devices, e.g., controllers, actuators, sensors, etc., including data collectors 110. Alternatively or additionally, in cases where the computing device 105 actually comprises multiple devices, the vehicle network may be used for communications between devices represented as the computing device 105 in this disclosure.

The data store 106 may be of any known type, e.g., hard disk drives, solid-state drives, servers, or any volatile or non-volatile media. The data store 106 may store the collected data 115 sent from the data collectors 110.

The vehicle 101 may include a plurality of subsystems 107. The subsystems 107 can include, e.g., an entertainment subsystem, a steering subsystem, a seat position subsystem (e.g., subsystems to adjust seat back angle, seat bottom position, etc.), a climate control subsystem, a human-machine interface (HMI), etc.

Data collectors 110 may include a variety of devices. For example, various controllers in a vehicle may operate as data collectors 110 to provide data 115 via the CAN bus, e.g., data 115 relating to vehicle speed, acceleration, system and/or component functionality, etc. including data 115 relating to the subsystems 107. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LIDAR, sonar, cameras, etc. sensors that could be deployed to determine occupant data 115, e.g., occupant body parts, occupant movement, etc.

Collected data 115 may include a variety of data 115 collected in a vehicle 101. Examples of collected data 115 are provided above, and moreover, data 115 is generally collected using one or more data collectors 110, and may additionally include data 115 calculated therefrom in the computer 105. For a data collector 110 that is a camera 110, the data 115 collected by the camera 110 may be image data 115. In general, collected data 115 may include any data 115 that may be gathered by the data collectors 110 and/or computed from such data 115.

Figure 2:
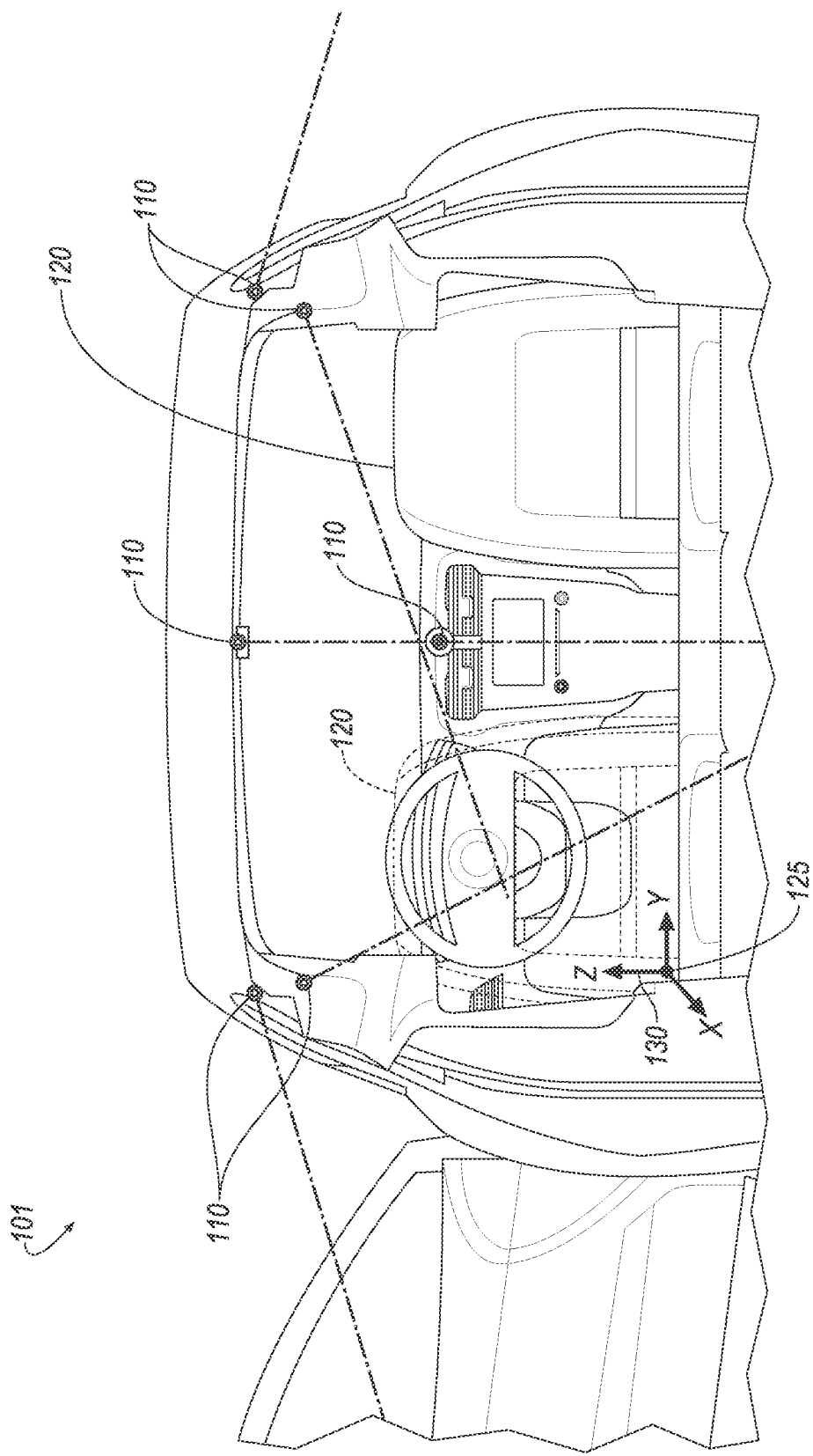
FIG. 2 illustrates data collectors positioned in the vehicle of FIG. 1.

FIG. 2 is a view of a passenger compartment of an example vehicle 101. The vehicle 101 includes a plurality of cameras 110. The cameras 110 may be, e.g., depth cameras, video cameras, etc., as are known. As described above, the cameras 110 collect image data 115 about a vehicle occupant. In the example of FIG. 2, the vehicle 101 includes six cameras 110 positioned throughout the vehicle 101. The dashed lines indicate an example direction from which the respective camera 110 may collect image data 115. Each camera 110 may have a field of view, i.e., a volume of space around the camera 110 that the camera 110 may collect image data 115. The field of view for each camera 110 may be based at least in part on the position of the camera 110 in the vehicle 101. For example, the field of view of one of the cameras 110 positioned on a left side of the vehicle 101 may include, e.g., image data 115 of a vehicle 101 operator, and the field of view of one of the cameras 110 positioned on a tight side of the vehicle 101 may include, e.g., image data 115 of a vehicle 101 passenger. Opaque objects, e.g., the vehicle seats 120, may limit the field of view to collect image data 115 of the vehicle 101 occupants. The cameras 110 are positioned to capture image data 115 from the entire occupant body in the passenger compartment. For example, some of the cameras 110 may be positioned to collect image data 115 outside of the vehicle 101, while other cameras 110 may collect image data 115 from, e.g., the area near the vehicle seat 120.

Furthermore, the cameras 110 may be arranged to collect image data 115 from more than one angle around the seat 120, e.g., in the vehicle 101 trim panel. For example, one of the cameras 110 may collect image data 115 from a left side of the seat 120, while another camera 110 may collect image data 115 from a right side of the seat 120. The image data 115 collected from the two sides of the seat 120 may collect data 115 that other cameras 110 may be unable to collect because, e.g., part of the seat 120 is blocking the view of the occupant to the camera 110. Furthermore, collecting image data 115 from more than one angle allows the computing device 105 to develop the occupant avatar, which may require image data 115 from more than one camera 110 to develop. That is, the image data 115 collected from each camera 110 may be a 2-dimensional projection of the 3-dimensional interior of the vehicle 101. To render a 3-dimensional avatar of the occupant from the 2-dimensional image data 115, the computing device 105 may use image data 115 from more than one camera 110 positioned at more than one angle relative to the occupant. The computing device 105 may combine the 2-dimensional image data 115 from the plurality of cameras 110 using known 3-dimensional reconstruction methods to render a 3-dimensional representation of the occupant, i.e., the avatar. In another example, if the cameras 110 are depth cameras, as are known, the image data 115 are 3-dimensional surface images that may be combined with image data 115 from other depth cameras 110 to develop the avatar.

The vehicle 101 typically includes a plurality of seats 120. The seats 120 support the vehicle 101 occupant when the occupant is in the vehicle 101. The seats 120 may prevent data collection of some of the cameras 110, so the cameras 110 are positioned to collect image data 115 from the vehicle 101 occupant and to account for the position of the seats 120.

Figure 3:
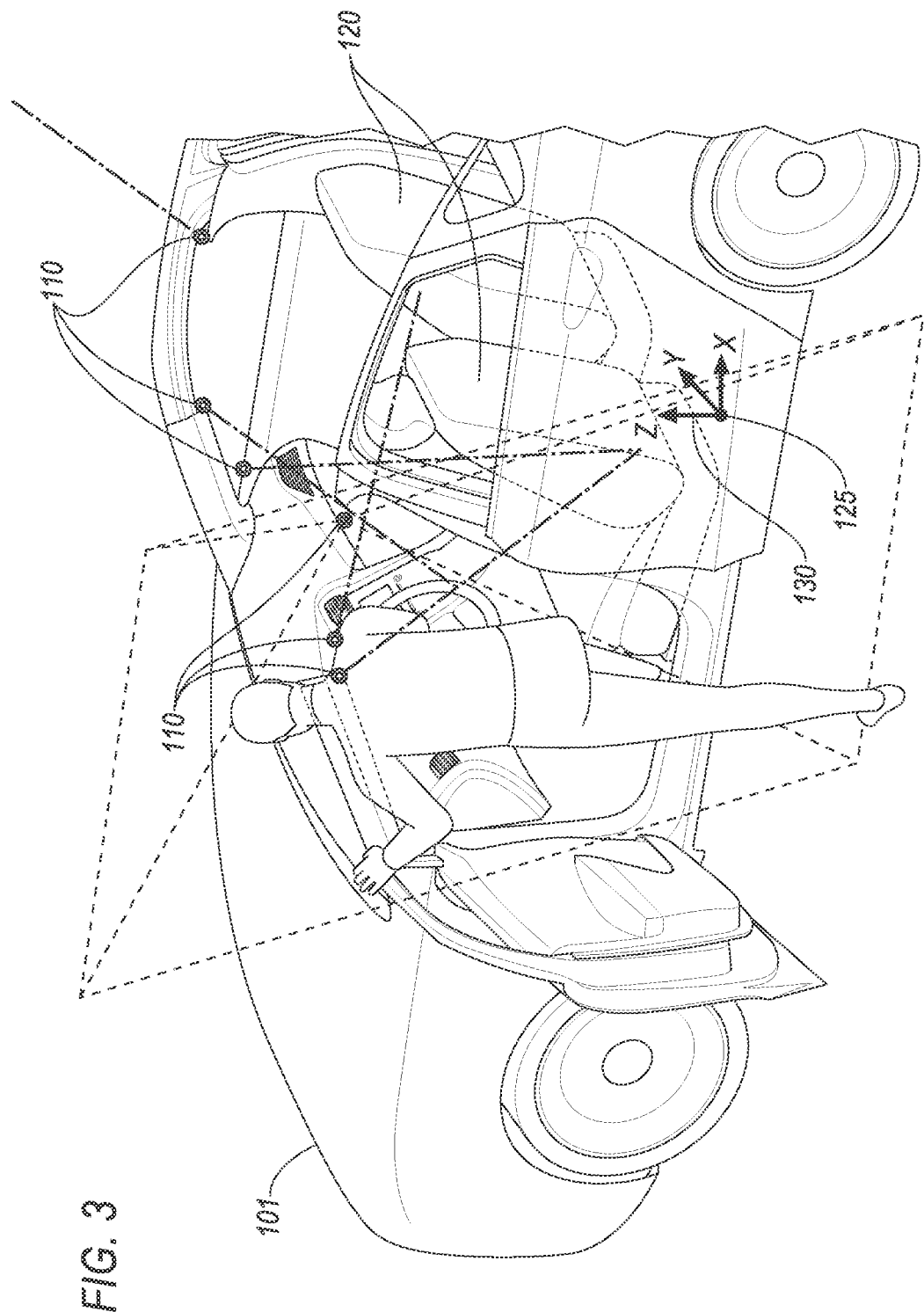
FIG. 3 illustrates an example occupant entering the vehicle of FIG. 1.
Figure 4:
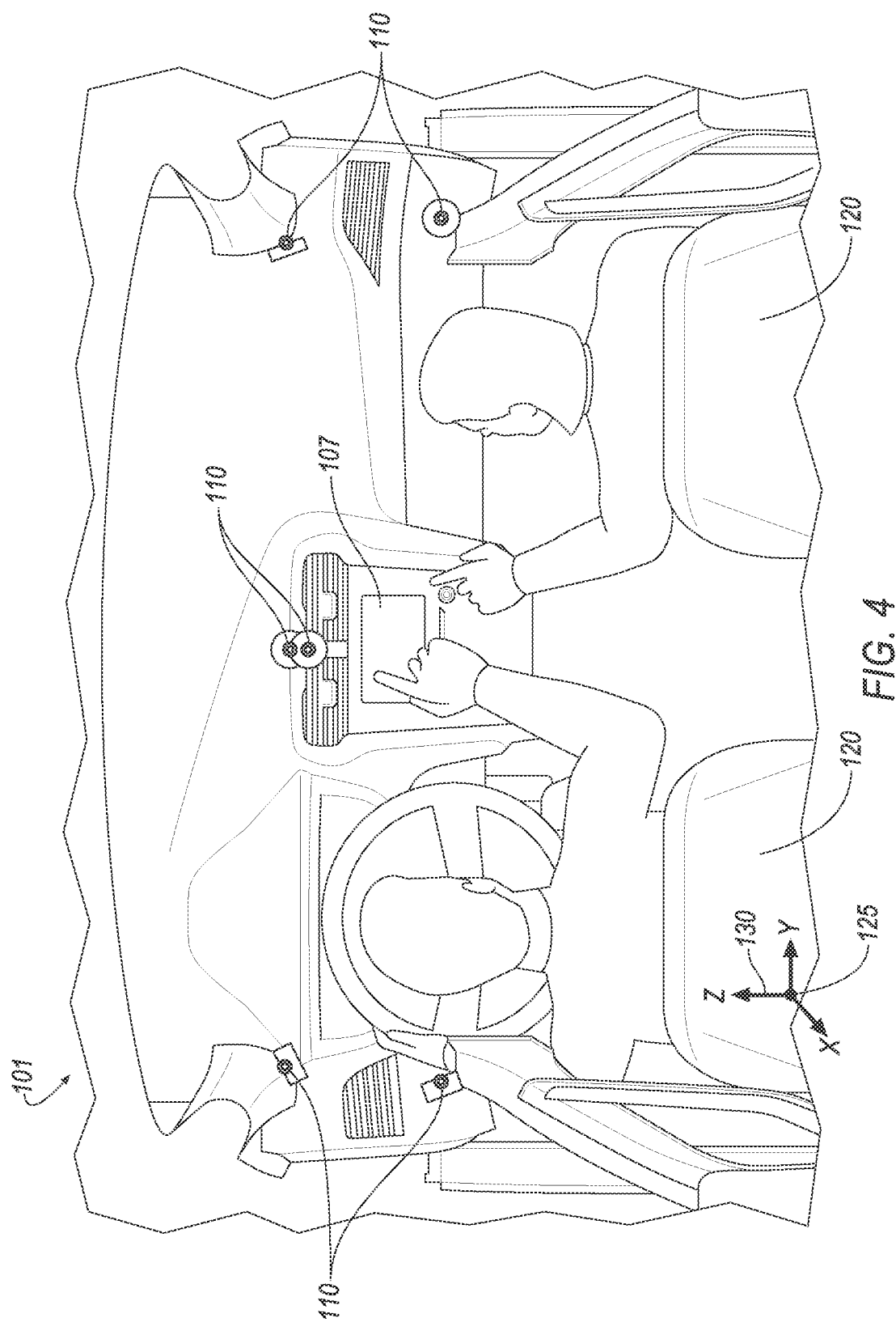
FIG. 4 illustrates an example gesture performed by occupants in the vehicle of FIG. 1.

A coordinate system 130 can be defined in the vehicle 101. The coordinate system 130 defines a position for elements in the vehicle 101, e.g., the seats 120, the subsystems 107, the occupants, etc. The computing device 105 may use the coordinate system 130 to develop a model of the vehicle 101 and the occupants. The coordinate system 130 may be a 3D coordinate system, e.g., a 3D Cartesian coordinate system, with a predetermined origin point 125. The origin point 125 may be, e.g., the Seating Reference Point (SGRP) as defined by the National Highway Traffic Safety Administration (NHTSA) and the Society of Automotive Engineers® (SAE) J1100 Standard (June 1984), as is known, or any point in the vehicle 101 from which the coordinate system 130 may define coordinates. The coordinates of the location of each camera 110 may be predetermined and stored in, e.g., the data store 106. In the example of FIGS. 2-4, the coordinate system 130 may define an X axis extending from the front of the vehicle 101 in a direction toward the rear of the vehicle 101, a Y axis extending from a left side of the vehicle 101 in a direction to a right side of the vehicle 101, and a Z axis extending in a direction up from a vehicle 101 floor.

The image data 115 collected by the cameras 110 may represent 2-dimensional projections of 3-dimensional objects, as described above. Each image datum 115, e.g., pixels in an image 115, may be mapped to a 2-dimensional coordinate system that is different from the coordinate system 130 of the vehicle 101, e.g., having an origin in a lower left-hand corner of an image. That is, the image data 115 may include a plurality of images comprised of pixels, and each pixel of the image data 115 may have a specific set of coordinates in the 2-dimensional coordinate system for a camera 110. The computing device 105 may, using known techniques, for each pixel of the image data 115, define a set of 3-dimensional coordinates in the coordinate system 130 for the pixel of the image data 115 based at least in part on the location of the camera 110 from which the image data 115 was collected and image data 115 collected from other cameras 110. That is, the computing device 105 may transform the 2-dimensional image data 115 from the cameras 110 into 3-dimensional data 115 in the coordinate system 130. In another example, if the image data 115 are 3-dimensional image data 115 collected from depth cameras 110, the images having coordinates in a coordinate system defined by the respective depth camera 110, the computing device 105 may, using known techniques, convert the coordinates of each 3-dimensional pixel of the images in the image data 115 to coordinates in the coordinate system 130. When the image data 115 are transformed into the coordinate system 130, the computing device 105 may combine the image data 115 from different cameras 110 to render the avatar using known methods.

For example, the computing device 105 may collect image data 115 of the interior of the vehicle 101 without the occupants, storing the image data 115 as a predetermined model of the interior. Then, when the cameras 110 collect image data 115 when the occupants are in the vehicle 101, the computing device 105 may compare the image data 115 to the predetermined model of the interior of the vehicle 101 and define the occupant avatar based on the data 115 collected by the cameras that differs from the predetermined interior model. That is, the pixels in that are present in the collected image data 115 but absent from the predetermined interior model can be interpreted by the computing device 105 as not part of the vehicle 101, i.e., the occupants. To determine which pixels represent the occupants, the computing device 105 calculates the difference between the collected data 115 and the predetermined interior model using known techniques. The remaining pixels after calculating the difference represent the occupants. Each camera 110 may only capture a part of each of the occupants because, e.g., the camera 110 is positioned such that a part of each of the occupants is blocked by an opaque object, e.g., the seat 120. More than one camera 110 may collect image data 115 that, when combined in the coordinate system 130, can render the avatar for substantially all of the occupant body. Thus, motion of the occupant captured by the cameras 110 as a series of images in the image data 115 may be converted from 2-dimensional motion as captured in the image data 115 to 3-dimensional motion of the avatar along the coordinate system 130. The computing device 105 may then actuate one of the vehicle subsystems 107 based on the motion of the avatar.

The computing device 105 is typically be programmed to recognize occupant body parts in the avatar. That is, the computing device 105 may be programmed to recognize specific shapes of the avatar that correspond to e.g., fingers, hands, arms, legs, head, neck, etc. For example, the computing device 105 may determine that the avatar includes two hands. In another example, the computing device 105 may, upon rendering the avatar, employ known image segmentation techniques and identify body parts associated with each segment. The computing device 105 may also compare the rendered avatar to a predetermined known 3-dimensional human model to identify the body parts. Based on the position of the hands in the coordinate system 130, the computing device 105 may determine that one of the hands is a left hand and the other hand is a right hand. That is, the hand having coordinates along the Y axis closest to the origin point 125, i.e., the leftmost hand, may be defined as a left hand of the occupant. The computing device 105 may render more than one avatar, each avatar representing body parts of one of the occupants. An example technique for recognizing occupant body parts is described by Sheasby, et. al., "Simultaneous Human Segmentation, Depth and Pose Estimation via Dual Decomposition," *Pro-* ceedings of the British Machine Vision Conference 2012, which is incorporated herein by reference.

The computing device 105 may be programmed to recognize gesture performed by the occupant. The gesture is, e.g., a movement of at least one occupant body part to actuate one of the vehicle subsystems 107. The computing device 105 may be programmed to recognize a plurality of predetermined gestures, each gesture defined by specific movements of the avatar, as is known. That is, the computing device 105 may collect the image data 115, render the avatar, recognize the body parts of the avatar, determine movement of the occupant body parts, and compare the movement of the avatar to the movement defining one of the predetermined gestures. The movement of the body parts is defined as, e.g., a trajectory in the coordinate system 130, i.e., a plurality of 3-dimensional vectors that describe a change in a position of the body parts. For example, if the hand of the occupant moves from the steering wheel toward the HMI 107, the trajectory may be defined by vectors increasing in a direction along the Y axis, decreasing in a direction along the X axis, and decreasing in a direction along the Z axis. The gesture in this example is defined as a predetermined trajectory, i.e., set of X, Y, Z coordinates, i.e., points, through which the body part moves, in the coordinate system 130.

The computing device 105 compares the trajectory of the body parts of the avatar to each of the gestures and use a hidden Markov model (HMM), as is known, to determine a specific gesture performed. The HMM includes a predetermined probability that the trajectory of the avatar results in performing one of the gestures, and the HMM may calculate which of the gestures, if any, is most probable to have been performed based on the trajectory of the avatar, as described by, e.g., Pavlovic, et al., "Visual Interpretation of Hand Gestures for Human-Computer Interaction," *IEEE Transactions on Pattern Analysis and Machine Intelligence*, vol. 19, no. 7, July 1997, 677-695, which is incorporated herein by reference. Another example gesture recognizing algorithm is described by Wu, et al., "Vision-Based Gesture Recognition: A Review," *Gesture-Based Communication in Human-Computer Interaction,* 2001, 103-115, which is incorporated herein by reference. The computing device 105 may include more than one HMM to determine the gesture performed by the occupant. Examples of gestures include, but are not limited to, reaching a hand to operate an entertainment subsystem 107, approaching the vehicle 101 toward a particular vehicle seat 120, placing hands on a vehicle 101 steering wheel, etc.

FIG. 3 illustrates an occupant entering the vehicle 101. At least one of the cameras 110 is positioned to collect image data 115 from the occupant outside of the vehicle 101. For example, one of the cameras 110 may collect image data 115 from the occupant as the occupant is opening a vehicle 101 door to enter the vehicle 101, shown in FIG. 3. By collecting image data 115 of the occupant from outside the vehicle 101, the computing device 105 may render the three-dimensional model of the occupant more quickly once the occupant is in the vehicle 101. Thus, the computing device 105 can then adjust vehicle subsystems 107 before or while the occupant enters the vehicle 101, e.g., adjusting the vehicle seat 120, the climate control subsystem 107, etc. For example, the model may indicate a height of the occupant and the computing device 105 may adjust the seat 120 based on the occupant's height. Collecting image data 115 from outside the vehicle 101 also allows for more accurate image data 115 to be obtained, as there are fewer obstacles (e.g., the seats 120, an instrument panel, a steering wheel, etc.) to obscure the occupant from the field of view of the cameras 110.

FIG. 4 is an illustration of an example gesture performed by a vehicle 101 operator and a vehicle 101 passenger. The vehicle 101 of FIG. 4 includes a vehicle 101 operator, here sitting on the left, and a vehicle 101 passenger, here sitting on the right. Typically, to prevent distracting the operator, the vehicle HMI 107 has reduced functionality when the vehicle 101 is in motion, e.g., a navigation subsystem 107 will not accept inputs. However, in one implementation, the passenger may be allowed to enter inputs into the HMI 107 even when the vehicle is moving and/or the HMI is otherwise disabled for the operator. The computing device 105 therefore needs to distinguish between the operator and the passenger (and their gestures).

To distinguish between the operator and the passenger, the cameras 110 collect image data 115 about the operator and the passenger and develop avatars described above for each of the operator and the passenger. With the avatars for the operator and the passenger, the computing device can differentiate between the operator's right hand, which here is closest to the HMI 107, and the passenger's left hand. The computing device 105 can then accept input only when the left hand of the passenger inputs into the HMI 107, and can deny input when the right hand of the operator inputs into the HMI 107. That is, using the model, the computing device 105 can recognize the gesture of inputting into the HMI 107 and distinguish the gestures of the operator and the passenger.

Similarly, there computing device 105 may accept inputs only from the operator and deny inputs from the passenger. The operator may prefer to maintain certain vehicle 101 settings, e.g., an ambient cabin temperature, a particular radio station, etc. The computing device 105 may be programmed to allow the operator to prevent the passenger from changing the preferred settings. Using the avatar, the computing device 105 may determine whether the gesture of changing one of these settings is performed by the operator (where the change is allowed) or the passenger (where the change is denied).

Figure 5:
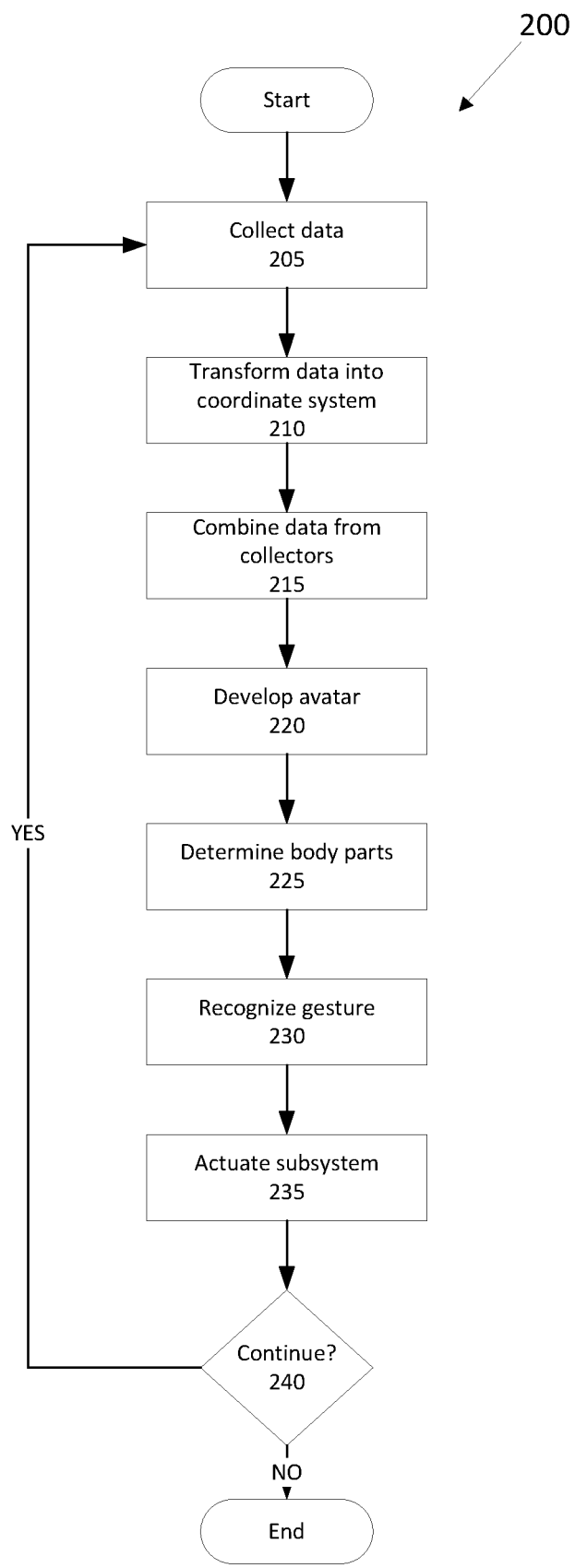
FIG. 5 illustrates a process for actuating a vehicle subsystem based on the gesture of FIG. 4.

FIG. 5 illustrates an example process 200 for adjusting a vehicle subsystem 107 based on the occupant avatar. The process 200 starts in a block 205 where the cameras 110 collect image data 115 of at least one vehicle occupant. The image data 115 include, e.g., occupant body shape, body position, body movement, etc.

Next, in a block 210, the computing device 105 transforms the data 115 from the individual coordinate systems of the cameras 110 to a vehicle coordinate system 130. That is, as described above, each camera 110 collects image data 115 according to a programmed 2-dimensional coordinate system defined by, e.g., the location of the camera 110. The computing device 105 assigns the image data 115 values in the single coordinate system 130. Because the image data 115 are defined in the coordinate system 130, the image data 115 may be combined using known 2D-to-3D image conversion techniques to develop the avatar, as discussed above.

Next, in a block 215, the computing device 105 combines the image data 115 from all of the cameras 110. Because all of the image data 115 are defined in the coordinate system 130, the computing device 105 can combine the image data 115 to characterize the occupant with image data 115 from all cameras 110. That is, the computing device 105 may develop a 3-dimensional map with image data 115 mapped to each coordinate of the map.

Next, in a block 220, the computing device 105 renders the occupant avatar based on the image data 115. The image data 115, now mapped into the coordinate system 130, can be used to develop a 3-dimensional model of the occupant, i.e., the occupant avatar. As described above, the computing device 105 tracks motion of the occupant collected by the cameras 110 as 2-dimensional or 3-dimensional image data 115 and converts the image data 115 into a 3-dimensional avatar of the occupant, i.e., motion detected by the image data 115 is converted into motion of the 3-dimensional avatar. The occupant avatar tracks the occupant's body parts and movements of the body parts in the vehicle 101, and can be used by the computing device 105 to analyze actions performed by the occupant and respond to the actions by, e.g., actuating vehicle subsystems 107. If the vehicle 101 has more than one occupant, the computing device 105 may render an avatar for each of the occupants.

Next, in a block 225, the computing device 105 determines the body parts of the occupant. As described above, the computing device 105 may use known model segmentation techniques to define segments of the avatar and compare the segments to known shapes of body parts to determine the body part corresponding to the respective segment. For example, the computing device 105 may determine the occupant's hands, arms, head, torso, etc. The coordinate system 130 has a predetermined resolution, i.e., spacing between discrete coordinate points, and the avatar may represent the occupant to a level of detail as small, i.e., fine, as the resolution. The size of the resolution may determine the body parts that can be determined by the computing device 105. For example, if the resolution is, e.g., 5 centimeters, then the avatar may identify motion of the occupant and body parts of the occupant as small as 1 cm, e.g., a hand. In another example, if the resolution is finer, e.g., 1 centimeter, then the avatar may identify smaller body parts, e.g., fingers. The coordinate system 130 have a predetermined resolution to allow for definition of the occupant's body parts by the computing device 105. The computing device 105 may refer to anatomical data 115, i.e., known information about the size and shape of a plurality of human body parts, stored in the data store 106 and/or the server 125 to determine the body parts. The computing device 105 may compare the occupant data 115 to the anatomical data 115 to identify the body parts. If the vehicle 101 has more than one occupant, the computing device 105 can determine different body parts for each occupant, e.g., an operator's right hand and a passenger's left hand.

Next, in a block 230, the computing device 105 recognizes a gesture performed by the occupant. The gesture is, e.g., a movement of an occupant body part to actuate one of the vehicle subsystems 107. Examples of gestures include, but are not limited to, reaching a hand to operate an entertainment subsystem 107, approaching the vehicle 101 toward a particular vehicle seat 120, placing hands on a vehicle 101 steering wheel, etc. The computing device 105 may be programmed with a plurality of predetermined gestures, each gesture defined by specific movements of the avatar. That is, the computing device 105 may collect the image data 115, render the avatar, and compare the movement of the avatar to the movement defining one of the predetermined gestures. The computing device 105 may determine that one of the gestures has been performed when, e.g., a HMM predicts that the movement of the avatar corresponds to one of the gestures. For example, one of the predetermined gestures may be reaching a hand toward the HMI 107. The computing device 105 may compare the movement of the hand of the avatar to the HMM, which may predict a probability that the gesture is performed. If the HMM predicts that the gesture is performed, as described above, then the computing device 105 determines that the occupant is performing the gesture. The predetermined gestures may include, e.g., a vehicle 101 operator grasping a steering wheel with his or her left hand and reaching toward the HMI 107 with his or her right hand, a vehicle 101 passenger reaching toward the HMI 107 with his or her left hand, a vehicle 101 occupant reaching toward a vehicle 101 interior light, etc.

Next, in a block 235, the computing device 105 actuates a vehicle subsystem 107 based on the gesture. For example, if the operator reaches with his or her right hand to operate the HMI 107, the computing device 105 may ignore the input from the operator's right hand. In another example, if the passenger reaches their left hand to operate the HMI 107, the computing device 105 may accept input from the passenger and adjust the HMI 107 accordingly. In yet another example, if the occupant opens a vehicle 101 door to enter the vehicle 101, the computing device 105 may adjust a seat subsystem 107 to move the vehicle seat 120 to a predetermined position for the occupant. For still another example, the occupant may extend his or her hand to actuate a vehicle 101 interior light, and the computing device 105 may actuate the interior light.

Next, in a block 240, the computing device 105 decides whether to continue the process 200. For example, the process 200 may end if driving operations, e.g., the vehicle 101, is powered off. If the computing device 105 decides to continue, the process 200 returns to the block 205 to collect more data. Otherwise, the process 200 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
   collect image data of substantially an entire body of a vehicle operator and substantially an entire body of a vehicle passenger from a plurality of cameras;
   generate a dimensional model of substantially the entire body of the vehicle operator and a second dimensional model of substantially the entire body of the vehicle passenger based on the image data;
   identify a right hand of the vehicle operator and a left hand of the vehicle passenger based on the dimensional models;
   based on the dimensional models of the vehicle operator and the vehicle passenger, recognize a gesture performed by one of the right hand of the vehicle operator or the left hand of the vehicle passenger;
   based on the gesture, accept, input to a vehicle human-machine interface from the left hand of the vehicle passenger and ignore input to the vehicle human-machine interface from the right hand of the vehicle operator; and
   adjust a vehicle subsystem based on the gesture.

2. The system of claim 1, wherein the instructions further include instructions to identify at least one occupant body part.

3. The system of claim 1, wherein the instructions further include instructions to transform the image data into a vehicle coordinate system.

4. The system of claim 1, wherein the gesture includes at least one of a hand moving to operate the vehicle human-machine interface and to grasp a steering wheel.

5. The system of claim 1, wherein the instructions further include instructions to detect the gesture by detecting movement of a plurality of body parts.

6. The system of claim 1, wherein the instructions further include instructions to collect at least some of the image data of the occupant when the occupant is outside the vehicle.

7. The system of claim 6, wherein the instructions further include instructions to adjust a vehicle seat when detecting the occupant outside the vehicle.

8. The system of claim 1, wherein the cameras are arranged in the vehicle to capture image data of substantially the entire body of the vehicle occupant.

9. A method, comprising:
   collecting image data of substantially an entire body of a vehicle operator and substantially an entire body of a vehicle passenger from a plurality of cameras;
   generating a dimensional model of substantially the entire body of the vehicle operator and a second dimensional model of substantially the entire body of the vehicle passenger based on the image data;
   identifying a right hand of the vehicle operator and a left hand of the vehicle passenger based on the dimensional models;
   based on the dimensional models of the vehicle operator and the vehicle passenger, recognizing a gesture performed by one of the right hand of the vehicle operator or the left hand of the vehicle passenger;
   based on the gesture, accepting input to a vehicle human-machine interface from the left hand of the vehicle passenger and ignoring input to the vehicle human-machine interface from the right hand of the vehicle operator; and
   adjust a vehicle subsystem based on the gesture.

10. The method of claim 9, further comprising identifying at least one occupant body part.

11. The method of claim 9, further comprising transforming the image data into a vehicle coordinate system.

12. The method of claim 9, wherein the gesture includes at least one of a hand moving to operate the vehicle human-machine interface and to grasp a steering wheel.

13. The method of claim 9, further comprising detecting the gesture by detecting movement of a plurality of body parts.

14. The method of claim 9, further comprising collecting at least some of the image data of the occupant when the occupant is outside the vehicle.

15. The method of claim 14, further comprising adjusting a vehicle seat when detecting the occupant outside the vehicle.

16. The method of claim 9, wherein the cameras are arranged in the vehicle to capture image data of substantially the entire body of the vehicle occupant.

* * * * *